Patented Nov. 4, 1952

2,616,918

UNITED STATES PATENT OFFICE 2,616,918

PRODUCTION OF DIESTERIFIED PHOSPHONO DERIVATIVES OF KETONES

Franklin Johnston, St. Albans, W. Va., assignor, by mesne assignments, to Union Carbide and Carbon Corporation, a corporation of New York No Drawing. Application March 5, 1949, Serial No. 79,913

10 Claims. (Cl. 260—461)

This invention relates to the production of a novel class of aliphatic, aromatic and mixed aromatic-aliphatic ketones containing at least one diesterified phosphono group in the molecule; and more especially it concerns products of the reaction of an organic phosphite diester with an unsaturated aliphatic, aromatic or mixed aliphatic-aromatic ketone containing at least one carbon-to-carbon double bond. Those unsaturated ketones containing only carbon and hydrogen in the molecule in addition to the carbonyl oxygen and those wherein the double bond of a carbonyl carbon atom or atoms is conjugated with a carbon-to-carbon double bond in the molecule are particularly useful in the process.

The novel compounds of the invention are substituted alkanones which are free from olefinic and acetylenic unsaturation and which contain only carbon, hydrogen, oxygen and phosphorus in the molecular structure.

The compounds have potential utility for many purposes such as for starting materials for the production of other phosphorus-containing compounds, and as possible plasticizers for various synthetic resins including the polyvinyl halides and the resinous copolymers of vinyl chloride and vinyl acetate.

Most of the preferred novel compounds of the invention may be represented by the formula $$RR'CXCHR^2COR^3$$

wherein R, R' and R², respectively, are selected from the class consisting of hydrogen and the alkyl, aralkyl and aryl groups, R³ is selected from the class consisting of the alkyl, aryl, benzyl, and $RR'CXCHR^2$— groups wherein R, R' and R² are selected from the aforesaid class; and X designates a diesterified phosphono radical having the formula

wherein R⁴ represents a radical selected from the class of alkyl, aryl, aralkyl, cycloalkyl, alkoxyalkyl, aryloxyalkyl and cycloalkoxyalkyl radicals.

Among the novel cycloaliphatic compounds of the invention are those having the general structure:

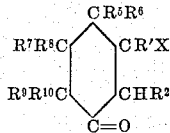

wherein R', R² and X have the meanings indicated supra, and R⁵ to R¹⁰ have the same meaning as R. The preferred cycloaliphatic compounds are those wherein R' and R⁵ to R¹⁰, respectively, can be hydrogen or an alkyl radical having one to four carbon atoms.

Compounds of this new type may be produced in accordance with the invention by reacting the appropriate phosphite diester with an aliphatic, aromatic or mixed ketone containing at least one carbon-to-carbon double bond, and preferably those containing only carbon and hydrogen in addition to the carbonyl oxygen and those in which the carbonyl double bond is conjugated with another carbon-to-carbon double bond.

The reaction preferably is conducted with dry but not necessarily anhydrous reagents, and usually in the presence of a small amount, i. e., around 0.5% to 5%, of a condensation catalyst. However, the use of a catalyst is not critical. The best results are secured with the alkaline condensation catalysts, among which are the alkali metals such as metallic sodium, potassium and lithium; alkali metal amides such as sodamide; alkali metal hydrides such as sodium hydride and potassium hydride; alkali metal alkoxides such as sodium methylate and ethylate; and the secondary and tertiary amines.

Effective catalysts are the alkali metal and alkaline earth metal salts of phosphite diesters of the type

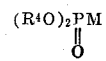

wherein M is an alkali metal or alkaline earth metal atom, and R⁴ has the meaning hereinbefore designated.

In one preferred form of the invention the unsaturated ketone is added in successive increments to an agitated solution or dispersion of the catalyst in the phosphite diester. The mixture usually is maintained at a reaction tempertaure between about 20° C. and about 100° C., although temperatures between 0° and 200° C. may be employed.

The addition of the ketone preferably is continued until at least one mol of the singly unsaturated ketone, or 0.5 mol of the doubly unsaturated ketone, has been added to the phosphite diester solution for each mol of the diester present therein. When one mol of a diolefinic ketone is reacted with one mol of the phosphite diester a diesterified phosphono keto-derivative is made which contains an olefinic bond; but when two mols of a phosphite diester are reacted with one mol of a diolefinic ketone the resultant keto-derivative is free from olefinic and acetylenic bonds and contains two diesterified phosphono groups in the molecule. The resultant reaction mixture is neutralized or slightly acidified with a suitable mineral acid such as sulfuric, hydrochloric or phosphoric acid, or with an organic acid such as acetic acid. Glacial acetic acid is usually preferred for this purpose. The neutralized reaction mixture then may be washed with water to remove water-soluble materials and afterwards fractionally distilled under vacuum, the fraction containing the diesterified phosphono ketone being separately recovered. It frequently is convenient to dilute the reaction mixture with an inert volatile solvent for the reaction product before washing the latter with water to avoid emulsification—to adjust the gravity of the organic liquid and to permit layering out of the water. The solvent then is removed during the subsequent fractional distillation.

The condensation reaction may be conducted in the presence of an inert volatile solvent for the reactants. The use of such a solvent is not essential, but is desirable when the ketone starting material is a solid under the reaction conditions, or is a poor solvent for the phosphite diester or for the catalyst. Suitable solvents include the aliphatic and aromatic hydrocarbons such as n-heptane, benzene and xylene; and ethers such as diethyl and dibutyl ethers, the diethers of the glycols and dioxane.

Among the phosphite diesters useful in the process may be mentioned the methyl, ethyl, isopropyl, butyl, hexyl, n-octyl, 2-ethylhexyl, decyl, hexadecyl, phenyl, benzyl, cyclohexyl, β-methoxyethyl, β-ethoxyethyl, β-butoxyethyl and β-phenoxyethyl phosphite diesters.

The alkyl and aryl phosphite diesters may be produced by various procedures known in the art. For example, certain of these diesters can be made by reacting the appropriate alcohol with phosphorus trichloride according to the equations:

$$3R^4OH + PCl_3 \longrightarrow (R^4O)_3P + 3HCl$$

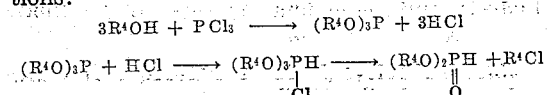

where $R^4$ represents an alkyl, cycloalkyl, aralkyl, alkoxyalkyl or aryloxyalkyl radical, excess hydrogen chloride being removed from the reaction mixture substantially as rapidly as formed. Diphenyl phosphite can be produced in the manner described in supplement to Beilstein VI, page 94.

Among the unsaturated ketones useful in the invention are α,β-unsaturated olefine ketones in which a carbon-to-carbon double bond is attached to a carbon atom adjacent the keto group, such as the vinyl alkyl and vinyl aryl ketones— e. g.—vinyl ethyl ketone, vinyl propyl ketone, vinyl isopropyl ketone, vinyl isobutyl ketone, and vinyl phenyl ketone; alkenyl alkyl and alkenyl aryl ketones such as propenyl methyl ketone (ethylidene acetone), propenyl ethyl ketone, propenyl butyl ketone, propenyl phenyl ketone, and 1-butenyl ethyl ketone; alkylidene acetones such as isopropylidene acetone (mesityl oxide), isobutylidene acetone, and isohexylidene acetone; benzylidene acetone (benzalacetone) and β-aryl substituted benzylidene acetones such as 2-phenylpropenyl methyl ketone and 2-benzylpropenyl methyl ketone; benzylidenemethyl ethyl ketone and benzylidenemethyl isopropyl ketone; cyclic unsaturated aliphatic ketones such as isophorone; benzylideneacetophenone; dypnone; and diolefinic ketones such as diisopropylideneacetone (phorone), cinnamylidene-acetone, benzal-mesityl oxide (benzylidene isopropylidene acetone), dibenzylidene acetone and cinnamylidene-acetophenone; and the triolefinic ketone, cinnamylidene-benzylidene-acetone.

The overall reaction is illustrated by the following equation involving the reaction of dibutyl phosphite and ethylidene acetone to produce 4-dibutylphosphono pentanone-2:

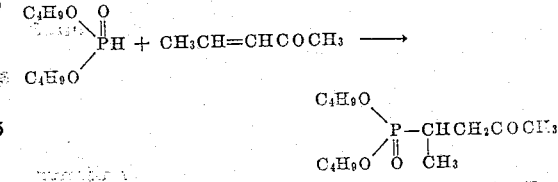

The following examples serve to illustrate the invention. In the examples all parts are given in terms of weight unless otherwise indicated.

*Example 1*

To a mixture of 194 parts (one mol) of dibutyl phosphite and 10 parts of sodamide in a vessel provided with an agitator and reflux condenser 84 parts (one mol) of ethylidene acetone were added during 15 minutes, and the reaction mixture was cooled to maintain the temperature near but below 75° C. The reaction was complete in 5 minutes, and the reaction mixture was neutralized with glacial acetic acid, washed with 450 parts of water, and fractionally distilled under vacuum, yielding 4-dibutylphosphono pentanone-2 as a light amber liquid boiling at 203° C. under a pressure of 2.3 mm. of mercury, and having a refractive index of 1.4503 at 30° C., and a specific gravity at 20° C. of 1.0630.

*Example 2*

Three parts of metallic potassium were added to 125 parts (.51 mol) of dicyclohexyl phosphite with heating to 80° C. to complete the reaction with formation of the potassium salt of dicyclohexyl phosphite. To this solution 75 parts (.51 mol) of benzalacetone were rapidly added with agitation of the mixture and the latter was heated for 30 minutes at 72° C. to complete the reaction. After cooling the mixture to 50° C. it was neutralized with glacial acetic acid, diluted with 100 parts of dibutyl ether, and washed with 300 parts of water. The washed mixture was filtered, and the filtrate was stripped of volatile materials in a Claisen type still to a kettle temperature of 175° C. at a pressure of 5.5 mm. of mercury. The residual product, 4-phenyl-4(dicyclohexylphosphono)butanone-2, was an oily red liquid having a specific gravity at 20° C. of 1.142 and a refractive index at 30° C. of 1.5024.

*Example 3*

During 15 minutes 146 parts (one mol) of benzalacetone were added to an agitated solution of 5 parts of sodamide in 194 parts (one mol) of dibutyl phosphite and the reaction continued for 20 minutes while adding 16 parts of sodamide and maintaining the temperature at 58° C.–65° C. to complete the reaction. The mixture then was cooled to 30° C., neutralized with glacial acetic acid, diluted with 250 cc. of benzene, and the benzene solution washed with 500 cc. of water. The benzene solution was filtered and the filtrate fractionally distilled in a Claisen type still, and 4-phenyl-4(dibutylphosphono)butanone-2 was separately recovered in 66% yield as an oily yellow liquid boiling at 192° C. under a pressure of 2.4 mm. of mercury, and having a specific gravity at 20° C. of 1.0545 and a refractive index at 20.5° C. of 1.4898.

Example 4

To a solution of 5 parts of sodamide in 87 parts (0.45 mol) of dibutyl phosphite there were slowly added 104 parts (0.5 mol) of benzalacetophenone dissolved in 200 cc. of benzene, and 8 additional parts of sodamide then were added during 12 minutes while cooling to maintain the temperature near but below 70° C. The reaction mixture was cooled to 30° C., neutralized with glacial acetic acid, diluted with 65 cc. of benzene, and washed with 500 cc, of water. The washed solution was filtered, and the filtrate was distilled to a kettle temperature of 151° C. under a pressure of 2 mm. of mercury. The residue then was fractionally distilled under high vacuum, yielding 2 - phenyl - 2 - (dibutylphosphono) ethyl phenyl ketone—as a viscous liquid boiling at 169° C. under a pressure of 0.5 mm. of mercury, and having a specific gravity at 20° C. of 1.0930 and a refractive index at 20.5° C. of 1.5365.

This compound was compatible with a vinyl chloride-vinyl acetate copolymer resin containing around 95% of the chloride in the polymer, in the proportion of 1:2.

Example 5

To 138 parts (one mol) of diethyl phosphite were added 3 parts of metallic sodium at room temperature. After completion of the reaction forming the sodium salt of dibutyl phosphite, 208 parts (one mol) of benzalacetophenone dissolved in 750 cc. benzene were added dropwise to the agitated solution during 55 minutes. The mixture was heated to 85° C. for an additional hour to complete the reaction and then was neutralized with glacial acetic acid, diluted with 100 cc. of benzene, washed with 675 cc. of water, and the benzene solution stripped in a Claisen type still to a kettle temperature of 236° C. at 5 mm. of mercury pressure. The resultant product, 2-phenyl-2-(diethylphosphono) ethyl phenyl ketone, was an amber, viscous liquid with a refractive index of 1.5767 at 30° C.

Example 6

222 parts (one mol) of dypnone (1-methyl-benzylidenemethyl phenyl ketone) were mixed with 194 parts (one mol) of dibutyl phosphite and heated in an oven at 100° C. for 713 hours. The reaction mixture was stripped under vacuum in a Claisen type still to a kettle temperature of 218° C. under a pressure of 3.7 mm. of mercury, thereby providing as residual product a yield of about 19% of 2-phenyl-2-dibutylphosphonopropyl phenyl ketone in the form of a dark viscous liquid. Upon distillation of this product in a molecular type high vacuum still the purified product was a reddish amber liquid boiling at 149° C. under a pressure of 4 microns of mercury. It had a specific gravity at 20° C. of 1.1048 and a refractive index at 30° C. of 1.5572.

Example 7

222 parts (one mol) of dypnone (1-methyl-benzylidenemethyl phenyl ketone) were slowly added to and reacted with an agitated solution of 5 parts of sodamide in 194 parts (one mol) of dibutyl phosphite during 1.5 hours while maintaining a temperature of 48°–65° C. The reaction mixture then was neutralized with glacial acetic acid, 250 cc. of benzene were added, the mixture washed with 500 cc. of water, the washed mixture filtered, and the filtrate fractionally distilled in a pot type still to a kettle temperature of 150° C. at 2.5 mm. of mercury pressure. The residue was fractionally distilled on a falling film type still, providing a yield of 59% of 2-phenyl-2-dibutylphosphonopropyl phenyl ketone.

This compound was compatible with a vinyl chloride-vinyl acetate copolymer resin containing around 95% of the chloride in the polymer in the respective proportions by weight of 1:2 or more.

Example 8

During 20 minutes 98 parts (one mol) of mesityl oxide were slowly added to an agitated mixture of 10 parts of sodamide and 194 parts (one mol) of dibutyl phosphite while cooling to keep the reaction mixture below 70° C. An additional 2 parts of sodamide were added, and the reaction was complete in a total of 33 minutes. The reaction mixture was neutralized with glacial acetic acid, 250 cc. of benzene were added, and the mixture washed with 500 parts of water. The washed benzene solution was filtered, and the filtrate fractionally distilled under vacuum in a Claisen type still, providing a 47% yield of 4-methyl-4-(dibutylphosphono)pentanone - 2 as a light yellow oily liquid having a boiling point of 158° C. under a pressure of 2.8 mm. of mercury, a specific gravity at 20° C. of 0.9967 and a refractive index at 30° C. of 1.4402.

Example 9

138 parts (one mol) of phorone were rapidly mixed with a solution of 10 parts of sodamide in 388 parts (2 mols) of dibutyl phosphite. Three additional parts of sodamide were introduced and the reaction completed at a maximum temperature of 44° C. The reaction mixture was neutralized with glacial acetic acid, 250 cc. of benzene were added, and the resultant mixture was washed with 750 cc. of water and the washed mixture stripped under vacuum in a Claisen type still to a kettle temperature of 220° C. under a pressure of 4.3 mm. of mercury, providing 2,6-di(dibutylphosphono) 2,6 - dimethylheptanone - 4 as a dark oily liquid having a refractive index at 30° C. of 1.4690.

Example 10

138 parts (one mol) of isophorone were added dropwise to a solution of 12 parts of sodamide in 194 parts (one mol) of dibutyl phosphite. The temperature was kept below 70° C. by cooling. Then 6 parts of sodamide were added and the reaction was completed. The reaction mixture was neutralized with glacial acetic acid, diluted with 250 cc. of benzene, the mixture washed with 500 cc. of water, and the washed mixture filtered. The filtrate was fractionally distilled under vacuum in a Claisen type still, providing a 61% yield of 3,5,5 - trimethyl - 3-(dibutylphosphono)cyclohexanone-1 boiling at 190° C. under a pressure of 2.2 mm. of mercury, and having a specific gravity at 20° C. of 1.0180, and a refractive index at 30° C. of 1.4590.

In similar manner, in accordance with the invention, the reaction of diethyl phosphite and vinyl propyl ketone yields 6-(diethylphosphono)-hexanone-1; that of dimethoxyethyl phosphite and propenyl ethyl ketone yields 5-(dimethoxyethylphosphono)hexanone-3; that of diphenoxyethyl phosphite and isopropylidene acetone yields 4 - methyl-4-(diphenoxyethylphosphono)pentanone-2; that of dibenzyl phosphite and isobutylidene acetone yields 5-methyl-4-(dibenzylphosphono)hexanone-2; that of dioctyl phosphite and isobutenyl propyl ketone yields 6-methyl-6-(dioctylphosphono)heptanone-4; and that of dicyclohexyl phosphite and vinyl ethyl ketone yields 5-(dicyclohexylphosphono)pentanone-3.

In the accompanying claims the term "a diesterified phosphono radical" is intended to designate radicals of the formula

wherein each $R^4$ designates a radical of the class hereinbefore described by $R^4$. The term "phosphite diester" is used to designate a compound of the type

wherein $R^4$ has the aforesaid meaning. The term "functional carbon atom" is intended to designate the carbonyl carbon atom of a keto group.

I claim:

1. Process for producing ketones having at least one diesterified phosphono radical attached to a corresponding carbon atom beta to a keto carbon atom, which comprises reacting a phosphite diester with an unsaturated ketone at a temperature of from 0° C. to 200° C. in the presence of a condensation catalyst, the said ketone having at least one olefinic double bond, the double bond of the carbonyl carbon atom of a keto group being conjugated with a carbon-to-carbon double bond in said ketone.

2. Process for producing ketones having at least one diesterified phosphono radical attached to a corresponding carbon atom beta to a keto carbon atom, which comprises reacting a phosphite diester with an unsaturated ketone at a temperature of from 0° C. to 200° C. in the presence of an alkaline condensation catalyst, the said ketone having at least one olefinic double bond, the double bond of the carbonyl carbon atom of a keto group being conjugated with a carbon-to-carbon double bond in said ketone.

3. Process for producing ketones having at least one diesterified phosphono radical attached to a corresponding carbon atom beta to a keto carbon atom, which comprises reacting a phosphite diester with an unsaturated ketone at a temperature of from 0° C. to 200° C. in the presence of an alkaline condensation catalyst and of an inert solvent for the reactants, said ketone having at least one olefinic double bond, the double bond of the carbonyl carbon atom of a keto group being conjugated with a carbon-to-carbon double bond in said ketone.

4. Process for producing ketones having at least one diesterified phosphono radical attached to a corresponding carbon atom beta to a keto carbon atom, which comprises reacting at a temperature of from 0° C. to 200° C., in the presence of a condensation catalyst, a phosphite diester and an unsaturated ketone having from one to two olefinic double bonds and having a structure corresponding to the formula $RCR'=CR^2COR^3$ wherein R is selected from the class consisting of hydrogen and the alkyl, aralkyl, aryl and aralkenyl radicals; R' and $R^2$ are selected from the class consisting of hydrogen and the alkyl, aralkyl and aryl radicals; and $R^3$ is selected from the group consisting of the alkyl, phenyl, benzyl and $-CR^2=CR'R$ radicals wherein R, R' and $R^2$ are selected from the aforesaid classes.

5. Process for producing ketones having at least one diesterified phosphono radical attached to a corresponding carbon atom beta to a keto carbon atom, which comprises reacting a phosphite diester with an unsaturated ketone at a temperature of from 0° C. to 200° C., the said ketone having at least one olefinic double bond, the double bond of the carbonyl carbon atom of a keto group being conjugated with a carbon-to-carbon double bond in said ketone.

6. As new compounds, ketones free from olefinic and acetylenic unsaturation, said ketones having two diesterified phosphono radicals attached to corresponding carbon atoms respectively beta to a keto carbon atom.

7. As new compounds, ketones having a structure designated by the formula $$RR'CXCHR^2COCHR^2CXRR'$$

wherein X designates a diesterified phosphono radical; R is selected from the class consisting of hydrogen and the alkyl, aralkyl, aryl and aralkenyl radicals; and R' and $R^2$, respectively, are selected from the class consisting of hydrogen and the alkyl, aralkyl and aryl radicals.

8. As a new compound, 2,6-di(dibutylphosphono)2,6-dimethylheptanone-4.

9. As new compounds, cyclic ketones having a structure corresponding to the formula

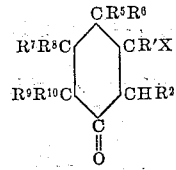

wherein $R^1$, $R^2$, and $R^5$ to $R^{10}$, respectively, designate radicals selected from the class consisting of hydrogen and the alkyl, aralkyl and aryl radicals; and X designates a diesterified phosphono radical having the formula

wherein $R^4$ represents a radical selected from the class consisting of the alkyl, aryl, aralkyl, cycloalkyl, alkoxyalkyl, aryloxyalkyl and cycloalkoxyalkyl radicals.

10. As a new compound, 3,5,5-trimethyl-3-(dibutylphosphono)cyclohexanone-1.

FRANKLIN JOHNSTON.

REFERENCES CITED

The following references are of record in the file of this patent:

UNITED STATES PATENTS

| Number | Name | Date |
|---|---|---|
| 2,268,158 | Marvel | Dec. 30, 1941 |
| 2,478,390 | Hanford et al. | Aug. 9, 1949 |
| 2,492,994 | Harman | Jan. 3, 1950 |